United States Patent [19] [11] 3,974,099
Lussier et al. [45] Aug. 10, 1976

[54] HIGH ACTIVITY AMORPHOUS SILICA-ALUMINA CATALYST

[75] Inventors: Roger Jean Lussier, Ellicott City; John Storey Magee, Jr., Cooksville; Edwin Wolf Albers, Annapolis; George John Surland, Woodbine, all of Md.

[73] Assignee: W. R. Grace & Co., New York, N.Y.

[22] Filed: Apr. 8, 1975

[21] Appl. No.: 566,579

[52] U.S. Cl. .............................. 252/453; 252/455 R
[51] Int. Cl.² ...................... B01J 37/02; B01J 29/06
[58] Field of Search ...................... 252/453, 455 R

[56] References Cited
UNITED STATES PATENTS

| | | |
|---|---|---|
| 2,844,523 | 7/1958 | Veltman et al. ............... 252/453 X |
| 2,872,410 | 2/1959 | Erickson ....................... 252/453 X |
| 3,003,951 | 10/1961 | Winyall ........................ 252/453 X |
| 3,124,541 | 3/1964 | Wilson, Jr. et al. ............... 252/453 |
| 3,433,748 | 3/1969 | Magee, Jr. et al. ............... 252/453 |

*Primary Examiner*—Carl F. Dees
*Attorney, Agent, or Firm*—Joseph P. Nigon

[57] ABSTRACT

An amorphous hydrocarbon cracking catalyst of high activity is prepared by mixing solutions of sodium silicate and sodium aluminate, allowing the gel and age, acidulating said gel to precipitate the excess aluminate and ion exchanging after drying to accomplish removal of the alkali metal.

6 Claims, No Drawings

3,974,099

HIGH ACTIVITY AMORPHOUS SILICA-ALUMINA CATALYST

BACKGROUND OF THE INVENTION

Petroleum hydrocarbon feedstocks boiling in the range above about 400°F. have been converted to lower hydrocarbons by heating them at a temperature of 600°F. to about 1100°F. in contact with amorphous silica-alumina cracking catalyst. The method of preparing the catalyst may be the determining factor in whether a particular composite may be useful commercially for a given process.

The prior art teaches various methods for the preparation of silica-alumina hydrogels. Generally, the most widely used method is similar to that disclosed in U.S. Pat. No. 3,650,989 and consists of first preparing a silica hydrogel by acidification of the alkali metal silicate which is then followed by a slurring of the gel in a solution of an aluminum salt and which is in turn followed by the addition of an ammoniacal base in excess to neutralize the salt and precipitate the oxide. Alternatively the aluminum salt (usually $Al_2(SO_4)_3$) is directly added to the alkali metal silicate followed by the same precipitation procedure described above. All of these prior art methods must resort to time consuming steps to insure $Na_2O$ removal. In addition, the catalysts formed by these procedures are not very hydrothermally stable.

The presence of small amounts of impurities may result in a significantly detrimental effect on the catalytic activity and this is particularly the case when these impurities are composed of the alkali metals. The presence of alkali metal ions results in a lowering of the acidity of the silica-alumina catalyst which consequently results in a lowering of the catalytic activity.

Heretofore, silica-alumina formed by known methods have been treated so that the sodium content (from the sodium silicate) is reduced to less than 1% and generally to about 0.05% otherwise such catalysts are not commercially acceptable. In order to achieve such low sodium concentrations prior methods have had to resort to numerous washing steps in order to remove the ion exchanged $Na_2O$.

DETAILED DESCRIPTION OF THE INVENTION

The first step in our novel process is the preparation of the solutions of sodium silicate and sodium aluminate. Sodium silicate solutions are prepared from commercially available sodium silicate having a $Na_2O$ content of about 8 percent and a $SiO_2$ content of about 26.6 percent. The sodium silicate solutions are prepared by diluting this silicate to a concentration of about 3 to 6, preferably about 4 percent $SiO_2$ with deionized water. The sodium aluminate was prepared by dissolving commercially available sodium aluminate ($Na_2O \cdot Al_2O_3 \cdot 3H_2O$) in deionized water. The solution is normally prepared to contain about 3 to 10, preferably about 8 percent sodium aluminate (about 4% as $Al_2O_3$).

In the next step of our process, the cogel is formed by mixing the sodium silicate and sodium aluminate solutions. The mixture is prepared to contain weight ratios of $Al_2O_3/SiO_2$ of 0.64 to 1 to 5.7 to 1. The gel is prepared by rapidly mixing the two solutions in a suitable vessel. After the gel is formed it is aged at a temperature of 70° to 180°F., preferably at about 145° to 155°F. for about ¼ to 2 hours, preferably about ½ hour.

In the next step of our process, the resulting gel is treated with a strong mineral acid. Although any strong mineral acid will give satisfactory results, because of its availability and low cost, sulfuric acid is preferred. The pH of the gel is adjusted to about 5 to 10, preferably about 8.5 to 9.5, by the addition of sulfuric acid in a concentration of about 5 to 15 percent, preferably about 10 percent.

In the next step of our process, the gel, at a pH of about 5 to 10 is dried. The gel may be dried either by spray drying or by oven drying at a temperature of about 200° to 300°F., preferably about 225° to 275°F. If the gel is oven dried, it must be ground to reduce the particle size of the product to about 80 to 450 mesh, preferably about 140 to 325 mesh to assure good contact of the solids with the exchanged liquid in the exchange step. Grinding in an impact mill gives satisfactory results.

In the next step of the process, the $Na_2O$ content of the gel is decreased to less than 1 percent. This $Na_2O$ removal is preferably carried out by successive exchanges with an ammonium sulfate solution. The exchanges are normally carried out in a solids to solution ratio of about 0.05 to 0.5 to 1.0, preferably 0.4 to 0.2 to 1.0. The ammonium sulfate solution is contacted with the product at a temperature of about 70° to 180°F., preferably 140° to 160°F. for a period of about ¼ to 2 hours. The $Na_2O$ content is reduced to less than about 0.1 percent after about 2 to 4 successive washes with ammonium sulfate solution. After the $Na_2O$ content is reduced to a suitably low level the product is washed with water until it is sulfate free as evidenced by the conventional barium chloride test for sulfate.

In our novel catalyst, sodium aluminate, where the alumina is tetrahedrally coordinated, causes sodium silicate solution to gel with incorporation of a portion of the alumina. The fraction of ungelled sodium aluminate depends upon the ratio of aluminate and silicate used.

During the acidulation of pH adjustment step the excess sodium aluminate is precipitated onto the silica-alumina gel. The essence of our invention is the fact that this precipitation of $Al_2O_3$ onto the silica-alumina gel stabilizes the cracking sites to hydrothermal deactivation. A silica-alumina gel prepared by mixing sodium aluminate (in excess) and sodium silicate (wt. ratio $SiO_2/Na_2O$ about 3.2) typically has about 38.6% $Al_2O_3$ when all the excess sodium aluminate is removed. A catalyst from this gel is not significantly more active than conventional 25% $Al_2O_3$ catalysts. We have made catalysts with only small amounts of precipitated alumina (about 42% $Al_2O_3$ or only about 3.5% precipitated alumina) which were considerably more active after hydrothermal deactivation than conventional 25% alumina catalysts. Preparations have been made up to about 85% $Al_2O_3$ which had the same level of activity as a conventional Rare earth-faujasite promoted catalyst. It appears that stabilization occurs as a result of the precipitation of alumina onto a silica containing gel, and is not due solely to the high levels of alumina. The source of the precipitated alumina can be aluminate, aluminum sulfate or other aluminum salts or complexes. The alumina precipitated in this fashion will greatly improve the hydrothermal stability of any silica containing gel.

The following examples, while in no way intended to be limiting, will aid in the understanding of this invention:

EXAMPLE 1

A silica-alumina cogel designated "A" and having a final composition of approximately 70% alumina and 30% silica was prepared by the following technique:

a. a solution of sodium aluminate was prepared by dissolving 149.6 grams of commercial sodium aluminate ($Na_2O.Al_2O_3.3H_2O$) in 1.7 liters of water.

b. A sodium silicate solution was prepared by diluting a commercial sodium silicate containing 8% $Na_2O$ and 26.6% silica to 4% $SiO_2$ with deionized water c. a cogel was prepared by mixing 1.75 liters of sodium aluminate solution with 0.75 liters of the sodium silicate solution with good agitation, d. the resulting gel was heated to 150° F. and aged at that temperature for ½ hour. At the end of this time the pH was adjusted to 8.5 by adding a 10% sulfuric acid solution. The resulting slurry was filtered and oven dried at 250°F. The product was then ground in an impact mill and exchanged with 1000 ml of a 10 % ammonium sulfate solution. This exchange was repeated 4 times. The final product had a $Na_2O$ content of less than 0.05%.

EXAMPLE 2

A silica alumina cogel designated cogel "B" having a final composition of approximately 85% alumina and 15% silica was prepared as follows:

a. a sodium aluminate solution was prepared by disolving 181.6 grams of commercial sodium aluminate ($Na_2O.Al_2O_3.3H_2O$) in 2.125 liters of water, b. a sodium silicate solution was prepared by diluting a commercial sodium silicate containing 8% $Na_2O$ and 26.6% $SiO_2$ to 4% $SiO_2$ with deionized water, c. 0.375 liters of the 4% sodium silicate and 2.125 liters of the sodium aluminate solutions were mixed with good agitation, d. the resulting gel was heated to 150°F. and maintained at that temperature for a period of ½ hour, e. the pH of the slurry was adjusted to 8.7 with 10% sulfuric acid solution and the resulting slurry filtered, and, f. the product was oven dried at 250°F. and ground in an impact mill. The ground material was exchanged to a $Na_2O$ content of less than 1% by successive exchanges with 1 liter of a 10 % ammonium sulfate solution. The product was then filtered and washed free of sulfate ions.

EXAMPLE 3

Silica-alumina amorphous catalysts A and B were prepared according to identical procedures as described in examples 1 and 2 respectively. The catalysts were tested and the results are outlined in Table I.

Table I illustrates volume percent conversion of hydrocarbons as a function of catalyst type used. The volume percent conversion for the cogel catalysts of the present invention were compared with an equivalent but conventionally prepared commercial amorphous catalyst and with crystalline aluminosilicate promoted catalysts prepared by blending the aluminosilicates with a semi-synthetic matrix (30% clay, 70% amorphous $SiO_2$–$Al_2O_3$).

Table I

| Catalyst No. | Type | Deactivation | Vol. % Conversion* |
|---|---|---|---|
| A | 70% $Al_2O_3$ Cogel | None | 68.9 |
| A | 70% $Al_2O_3$ Cogel | 8 hrs., 1350°F., | 65.5 |
| B | 85% $Al_2O_3$ Cogel | 8 hrs., 1350°F., 100% Steam | 68.0 |
| C | Commercial 25% $Al_2O_3$ | None | 63.9 |
| C | Commercial 25% $Al_2O_3$ | 8 hrs., 1350°F., 100% Steam | 50.0 |
| D | 2.5 wt. % CREY in semi-synthetic matrix | 8 hrs., 1350°F., 100% Steam | 57.3 |
| E | 5.0 wt. % CREY in semi-synthetic matrix | 8 hrs., 1350°F., 100% Steam | 66.9 |

CREY - Calcined rare earth faujasite

The microactivity determination was carried out at a temperature of 920°F., a weight hourly space velocity of 16, and a catalyst-to-oil ratio of 6 using West Texas Gas Oil as the feed.

This data shows that the cogel catalysts of the present invention (A & B) are more active than conventional amorphous catalysts (C) and the aluminosilicate promoted catalysts containing 2.5 weight percent calcined rare earth faujasite.

EXAMPLE 4

An amorphous silica-alumina catalyst containing approximately 80% $Al_2O_3$ was prepared according to essentially the same procedure as described in Example 2. The catalyst was used in a pilot unit test and the test results are as outlined on Table II.

Table II

| Catalyst No. | 80% $Al_2O_3$ — Cogel of present invention | | Conventional High alumina(25 wt.%) | |
|---|---|---|---|---|
| Weight Hourly Space Velocity | 40 | 20 | 20 | 10 |
| Volume % Conversion[1]: | 65.0 | 71.0 | 57.5 | 64.0 |
| Volume % FF gasoline: | 54.0 | 56.5 | 48.0 | 51.5 |
| Gasoline/Conversion Ratio: | 0.83 | 0.79 | 0.83 | 0.81 |
| Weight % FF Code: | 4.0 | 5.2 | 3.2 | 3.7 |

[1]After 20% steaming, for 8.0 hours, at 1520°F.

The pilot unit activity determination was carried out at a temperature of 920°F. weight hourly space velocities as listed above on Table II, and a catalyst-to-oil ratio of 4 using West Texas Gas Oil as the feed.

The results show that the amorphous silica-alumina catalyst prepared according to the present invention is much more active than a conventional high alumina catalyst containing 25 wt. percent alumina.

EXAMPLE 5

Amorphous silica-alumina catalysts containing approximately 80% Al$_2$O$_3$ were prepared according to essentially the same procedure as described in Example 2. The catalysts were promoted with low levels of zeolite promoters and their test results compared to those of conventional amorphous silica-alumina catalysts containing 25 wt. percent alumina which are zeolite promoted. The test results are set out in Table III.

Table III

| Catalyst No. Type | Wt. % Zeolite | Sieve Type | Volume % Conversion |
|---|---|---|---|
| 80% Al$_2$O$_3$ Cogel of present invention | 0.0 | — | 56.0 |
| " | 10.0 | H-Y | 63.1 |
| " | 3.0 | CREY | 72.5 |
| " | 6.0 | CREY | 75.5 |
| Conventional (25% Al$_2$O$_3$) | 5.0 | RE-Y | 57.0 |
| Conventional (25% Al$_2$O$_3$) | 15.7 | RE-Y | 67.8 |
| Conventional (25% Al$_2$O$_3$) | 20.0 | H-Y | 51.0 |

The microactivity determination was carried out at a temperature of 920°F., a weight hourly space velocity of 16, a catalyst-to-oil ratio of 3, after deactivation at 1350°F. for 8.0 hours with 100% steam using West Texas Gas Oil as the feed.

The test results clearly indicate that when the high activity amorphous catalysts of the present invention are promoted with low levels of zeolite promoters, they are as active as conventional catalysts with many times as much zeolite. Even less active zeolites such as exchanged faujasite in the hydrogen form (calcined or uncalcined) become useful promoters at low imputs with the amorphous high activity matrix of our invention.

EXAMPLE 6

An amorphous catalyst containing 42% Al$_2$O$_3$ and 58% SiO$_2$ was prepared by mixing streams of sodium aluminate (4% as Al$_2$O$_3$) and sodium silicate (4% as SiO$_2$) in the proper porportion, aging the resulting loose gel ½ hour, adjusting the pH to 9.5 to precipitate the excess aluminate, filtering, spray drying and washing the product to low Na$_2$O (0.24%) with four reslurry exchanges with 10% (NH$_4$)$_2$SO$_4$. The test results are given in Table IV.

Table IV

| Catalyst No. | Type | % Al$_2$O$_3$ | Sieve | Vol.% Conv. |
|---|---|---|---|---|
| A | Amorphous | 41.8 | — | 54.0 |
| B | Conventional Matrix | 25.0 | 5.0% RE-Y | 57.0 |
| C | Amorphous | 80.0 | — | 56.0 |
| D | Amorphous (conventional) | 25.0 | — | 37.0 |

The Microactivity Test was carried out at a temperature of 920°F., a wt. hourly space velocity of 6, a catalyst to oil ratio of 3, after the catalyst had been deactivated by contact with 100% steam at a temperature of 1350°F. for a period of 8 hours.

The test results indicate that the 42% alumina sample prepared according to this invention is approximately equivalent in activity to a 5% RE-Y promoted catalyst or the 80% Al$_2$O$_3$ (also of this invention), but far superior to the conventional amorphous catalyst.

What is claimed is:

1. A process of preparing a high amorphous hydrocarbon cracking catalyst which comprises:
    a. mixing solutions of a soluble aluminum compound and sodium silicate in a weight ratio of Al$_2$O$_3$ to SiO$_2$ from 0.64 to 1 to 5.7 to 1
    b. aging the resulting gel,
    c. adjusting the pH of the gel to a pH of 5.0 to 10.0 to precipitate excess alumina,
    d. drying the resulting composite,
    e. grinding and exchanging with an ammonium sulfate solution to reduce the Na$_2$O content to less than 1 percent, and,
    f. washing, drying and recovering the product.

2. The process according to claim 1 wherein the soluble aluminum compound is sodium aluminate.

3. The process according to claim 1 wherein gel is aged at a temperature of 70 to 180°F. for about ½ hour.

4. The process according to claim 1 wherein the pH of the gel is adjusted with a 10% solution of sulfuric acid.

5. The process according to claim 1 wherein the product contains about 40 to 85 percent alumina and about 15 to 60 percent silica.

6. The process according to claim 1 wherein the Na$_2$O is reduced to less than 0.5 percent by successive washes with a 10 percent ammonium sulfate solution.

* * * * *